(12) United States Patent
Lindsey et al.

(10) Patent No.: US 10,218,079 B2
(45) Date of Patent: Feb. 26, 2019

(54) PERIODIC ARRAY ASSEMBLY COMPRISING ARRAYS OF PERIODIC ELEMENTS HAVING INWARDLY EXTENDING PROTRUSIONS

(71) Applicant: Venti Group LLC, Miami Beach, FL (US)

(72) Inventors: Phillip Lindsey, Derby, KS (US); Dow A. Eichenlaub, Miami Beach, FL (US)

(73) Assignee: VENTI GROUP, LLC, Miami Beach, FL (US)

( * ) Notice: Subject to any disclaimer, the term of this patent is extended or adjusted under 35 U.S.C. 154(b) by 0 days.

(21) Appl. No.: 15/478,193

(22) Filed: Apr. 3, 2017

(65) Prior Publication Data

US 2018/0062233 A1 Mar. 1, 2018

Related U.S. Application Data

(60) Provisional application No. 62/380,835, filed on Aug. 29, 2016.

(51) Int. Cl.
*H01Q 15/00* (2006.01)
*H01P 1/20* (2006.01)
*H04M 1/02* (2006.01)

(52) U.S. Cl.
CPC ....... *H01Q 15/0013* (2013.01); *H01P 1/2005* (2013.01); *H01Q 15/0053* (2013.01); *H01Q 15/0093* (2013.01); *H04M 1/0202* (2013.01)

(58) Field of Classification Search
CPC .......... H01Q 15/0013; H01Q 15/0093; H01Q 15/0006
USPC ........................................................ 343/909
See application file for complete search history.

(56) References Cited

U.S. PATENT DOCUMENTS

| | | | |
|---|---|---|---|
| 6,218,978 B1 * | 4/2001 | Simpkin et al. ... | H01Q 15/0026 342/5 |
| 6,900,763 B2 * | 5/2005 | Killen et al. ....... | H01Q 15/0053 333/202 |
| 2013/0222200 A1 * | 8/2013 | Ju .......................... | H01Q 15/02 343/833 |

* cited by examiner

*Primary Examiner* — Benny Lee
(74) *Attorney, Agent, or Firm* — McClure, Qualey & Rodack, LLP

(57) ABSTRACT

Periodic structure assemblies are provided. An example assembly includes: a dielectric layer having a top and a bottom; a first frequency selective layer disposed on the top of the dielectric layer, the first frequency selective layer having a plurality of electrically conductive elements arranged as a first periodic structure; and a second frequency selective layer disposed on the bottom of the dielectric layer, the second frequency selective layer having a plurality of electrically conductive elements arranged as a second periodic structure. Another periodic structure assembly includes: a substrate; and an array of periodic elements defined by a contiguous trace of conductive material supported by the substrate, each of the periodic elements exhibiting side walls, with each of the side walls having an inwardly extending protrusion.

20 Claims, 10 Drawing Sheets

PERIODIC ARRAY ASSEMBLY COMPRISING ARRAYS OF PERIODIC ELEMENTS HAVING INWARDLY EXTENDING PROTRUSIONS

CROSS REFERENCE

This utility patent application claims the benefit of and priority to U.S. provisional application 62/380,835, filed 29 Aug. 2016, which is incorporated herein in its entirety.

BACKGROUND

Technical Field

The disclosure relates to periodic structures for affecting energy propagation.

Description of the Related Art

A periodic structure is an arrangement used on a Frequency Selective Surface (FSS), defined as a periodic spatial filtering structure that selectively reflects, transmits, or absorbs electromagnetic fields. Periodic structures are also found in Electromagnetic Band Gap (EBG) and Photonic Band Gap (PBG) use, with a periodic arrangement of conductive elements, dielectric or magnetic apertures resulting in the formation of stop bands.

Periodic structures are typically constructed by creating an electrically conductive element and then repeating that element over the surface in two directions with designed spacing. This conductive structure is positioned on a non-conductive substrate material at the periodicity desired.

Periodic structures are used to selectively allow certain frequency ranges of electromagnetic waves to pass through a device while rejecting or attenuating others that lie outside of the desired frequency band.

A common example of a periodic structure used as an FSS can be found in the door of a microwave oven. The periodic structure in the door, while allowing light to pass through the door, at the same time reduces the harmful radiation levels passing through the door to acceptable limits.

The current state of the art is limited to narrow frequency bands that can be attenuated.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE INVENTION

Figure 1:
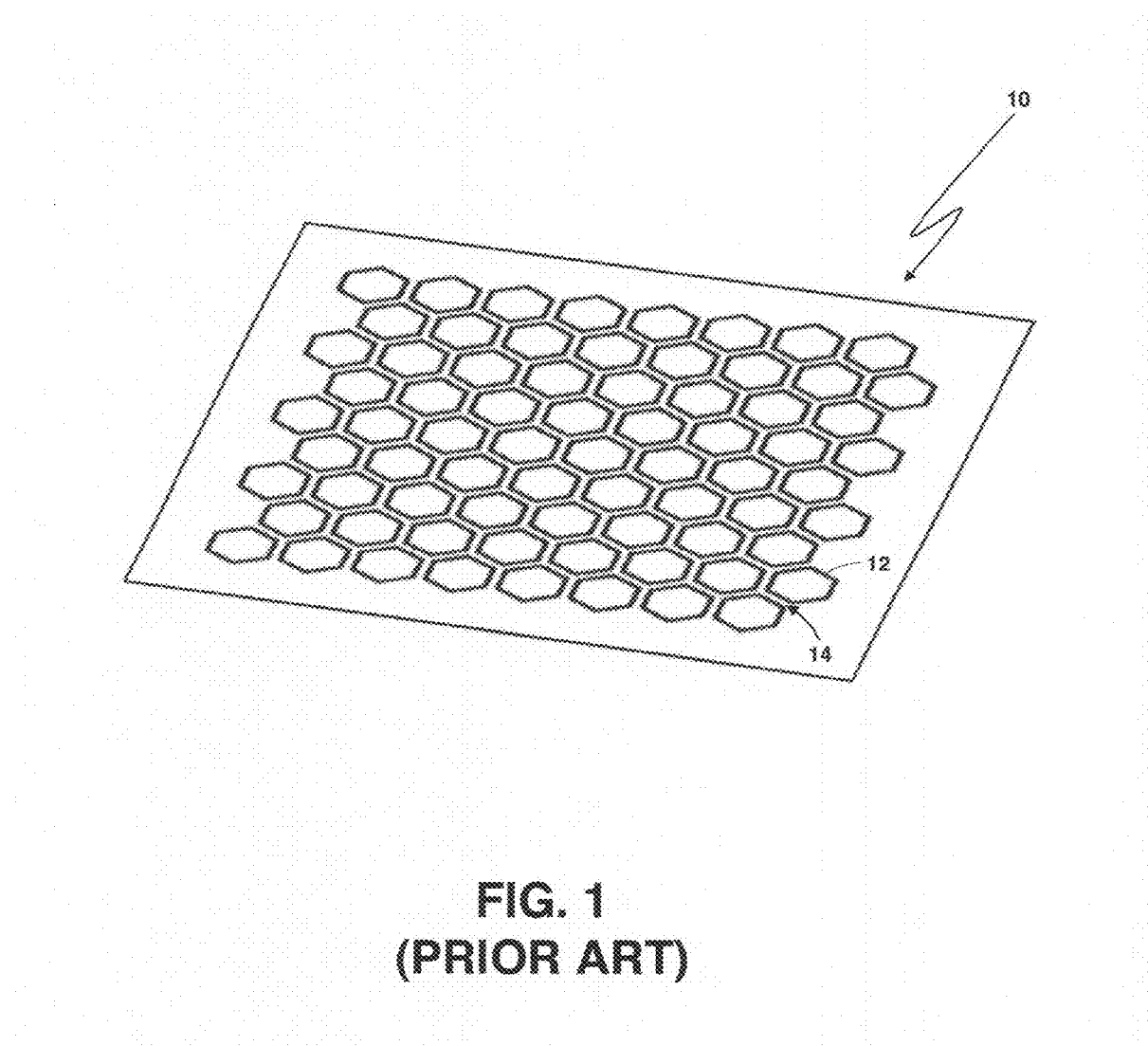
FIG. 1 is a schematic diagram of a prior art Frequency Selective Surface (FSS) as may be used with a door of a microwave oven.

Reference will now be made in detail to that which is illustrated in the drawings. While the disclosure will be described in connection with these drawings, there is no intent to limit the scope of legal protection to the embodiment or embodiments disclosed herein. Rather, the intent is to cover all alternatives, modifications and equivalents included within the spirit and scope of the disclosure.

As disclosed herein, embodiments of a multi-band periodic structure may address the need for the reduction of broadband electromagnetic fields emanating in either unwanted or unintended directions from devices utilizing RF transmissions and/or the reception of RF transmissions while having minimal impact on the operational patterns and characteristics of the radio waves in the intended direction. These devices include, for example, smartphones and other portable RF devices across multiple bands of operation, base station antennas, omnidirectional antennas and directional antennas, including panel-type antennas.

In the case of a smartphone or other portable RF device, by applying this multi-band periodic structure (MBPS) to the smartphone or RF device that resides close to the user, the radiation levels that the user is exposed to are reduced.

Generally for the use in other RF devices, embodiments of an MBPS may also address the need for the reduction of the electromagnetic fields emanating across multiple frequency bands of operation as undesired radio frequency back or side lobes from a radio frequency device used for sending or receiving electromagnetic waves such as an antenna. By way of example, antennas can include base station antennas, omnidirectional antennas, directional panel-type antennas or other types of antennas. Embodiments of an MBPS may be implemented in these devices as an independent sub-component or be implemented in these other devices as a ground plane. The use of embodiments of an MBPS for mitigation of RF signals such as back or side lobes will not have undesirable effects on the desired RF waves.

Embodiments of an MBPS are both novel in approach to attenuation as well as increasing the bandwidth that can be addressed in the application, for example having the ability to attenuate the entire Long Term Evolution (LTE) spectrum (698 MHz to 2700 MHz).

In this regard, a conventional periodic structure used on a FSS, EBG, or PBG typically is made up of identical conducting structures that radiate in two directions lying in a plane (such as can be seen in FIG. 1) or by apertures cut into a conduction screen forming a periodic structure of apertures.

FIG. 1 shows a common periodic structure 10 that is used to reduce electromagnetic waves over a band of frequencies, whose characteristics are well known and established. The element in this device (e.g., element 12) is commonly referred to as a hexagonal cell. The element is periodically repeated in two directions with the element size and gap (e.g., gap 14) directly relating to the desired band of frequencies to be rejected by the structure.

Most of these conventional structures are made of conductive materials that are etched onto a substrate. Conventional periodic structures filter electromagnetic waves, either allowing them to pass through with minimal loss or rejecting them. In this case, the frequency response is dependent on the type of element array, the period of the array, or the electrical properties of the surrounding dielectric material. The period of the array can be determined by the center-to-center spacing of the array elements or apertures.

The size of any given periodic structure is related to the wavelength in which the structure is designed to operate. That is, the wavelength determines the size of the array elements and the period of the structure. In general, therefore, lower frequencies require larger periodic structures.

Figure 2:
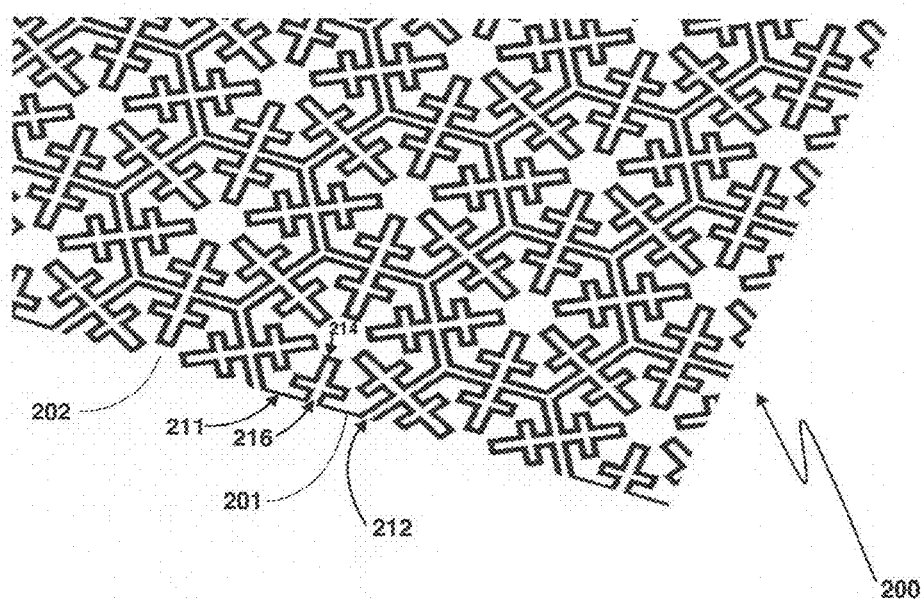
FIG. 2 is a schematic diagram of a prior art periodic structure.

As shown in FIG. 2, another example of a periodic structure 200 incorporates a second iteration fractal geometry that is applied to the hexagonal cell. In particular, in FIG. 2, periodic structure 200 incorporates cells formed of conductive traces (e.g., trace 201, which forms cell 211) and non-substrate or air (202).

This configuration has been shown to provide band-stop filtering, while utilizing a smaller hexagonal area than can be achieved by the common structure shown in FIG. 1. Note that the cells of the structure are separated from each other, with gaps (e.g., gap 212) being located between adjacent cells. Additionally, protruding features of each cell (e.g., feature 214) are formed by peripheral (outlining) traces that define interior voids (e.g., void 216) within the features themselves that are lacking in conductive material.

Therefore, by way of example use of a compact periodic structure that addresses the broad frequency bandwidth of cellular transmissions that at the same time provides a directionally controlled significant loss that protects the user from the harmful effects of electromagnetic radiation from smartphones and other RF devices used in close proximity to the human body while at the same time creating no degradation (and potentially enhancing) the capability of the RF device to perform as otherwise intended is desirable.

In the case of a smartphone, it is also often desirable to place the periodic structure on the display of a smartphone or other RF device by the user as aftermarket protection. This requires that such protection be provided externally from the device, while at the same time allowing the display to be viewed with minimal degradation to the user's experience.

In the case of RF devices such as antennas, it is often desirable to manage the unwanted directions of omni-directional, directional and base station antenna patterns to maximize the antenna's performance in the field of use without significantly impacting the RF patterns in the desired field of use. These unwanted directions are often referred to as back and side lobes that tend to bleed antenna gain while providing no useful benefit.

Embodiments of an MBPS may exhibit one or more of the following: reduce electromagnetic waves radiating over multiple commonly used radio frequency (RF) bands; be applied as a thin, flexible film substrate or any substrate on non-conductive material, (e.g., PCB); fit into a smaller space than conventional periodic structure; reduce the levels of radiation exposure to users of small devices such as smartphones or other RF devices; be applied to the screen of the device, while still allowing the user to see the screen vividly; and, be used in any RF device to control RF signal direction without degrading the patterns in the intended field of use.

An example embodiment of an MBPS includes at least one sheet-like frequency selective layer made up of an array of electrically conductive elements supported by a substrate of dielectric material. Each of the layers may optionally be inserted between layers of dielectric material. Each of the conductive layers, if there is more than one, will be parallel to the others, but separated by a dielectric layer.

Figure 3A:
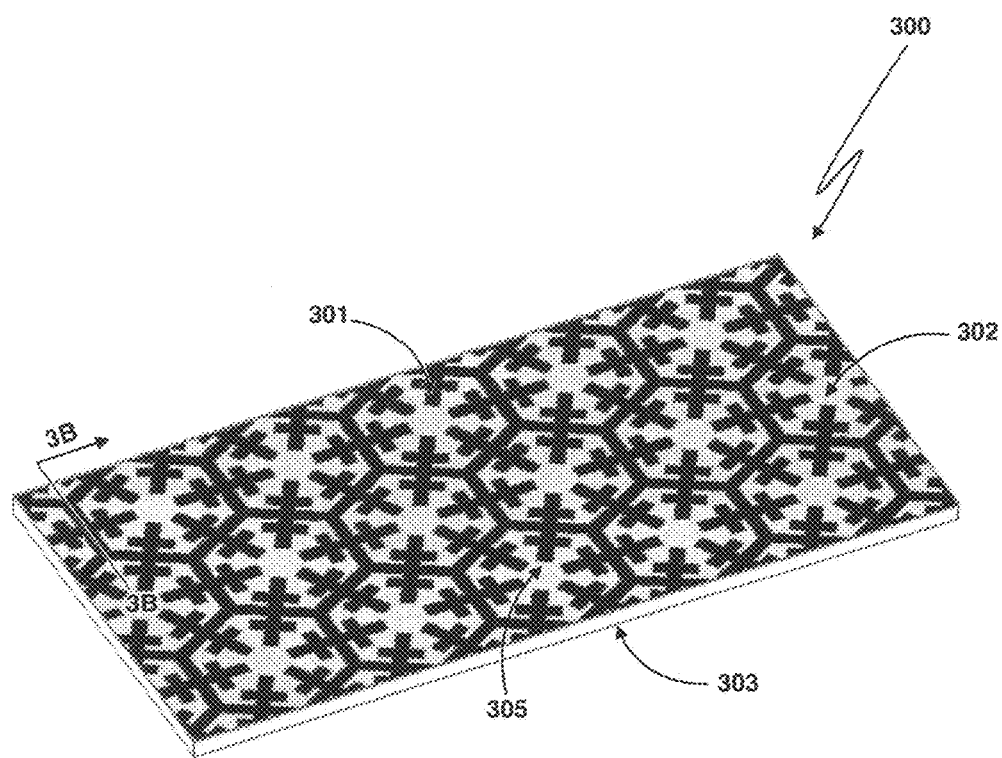
FIG. 3A is a schematic diagram of an embodiment of a multi-band periodic structure assembly.

An example embodiment of an MBPS is shown in FIG. 3A, in which (in contrast to that shown in FIG. 2) gaps between elements are filled with conductive material, thus forming a contiguous conductive array. Additionally, unlike the peripheral traces of FIG. 2, the conductive features of FIG. 3A are filled with conductive material (i.e., the conductive features do not exhibit interior voids). This configuration creates a compact high-pass structure that can be placed on a flexible substrate, can be applied to a smartphone or RF device without degrading the user interface, and will reduce unwanted hazardous radiation to users of the device.

Figure 3B:
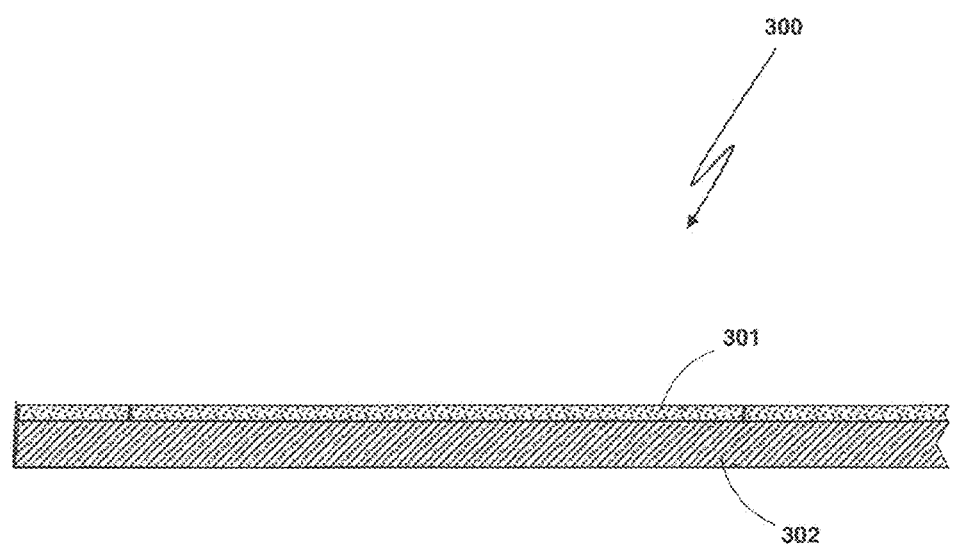
FIG. 3B is a schematic, cross-sectional view of the embodiment of FIG. 3A as viewed along section line 3B-3B.

As shown in FIGS. 3A and 3B, the embodiment of a periodic structure assembly 300 incorporates a contiguous (e.g., continuous) conductive trace 301 supported by a substrate 302 of dielectric material. In some embodiments, such as that shown in FIGS. 3A and 3B, the substrate is a single layer substrate, whereas in other embodiments a multiple layer substrate may be used.

The dimensions and periodicity of the embodiment of FIG. 3A (known as a Compact Multi-Band Periodic Structure (CMBPS)) with a frequency range of 698 MHz to 2700 MHz are disclosed to have a periodic lattice of 11.9 millimeter (inner hexagonal cell side length) and second iteration hexagonal elements that are spaced 2.2 millimeter from each of the nearest elements. Both the periodic lattice size and element spacing are determined by the contributing effects of the smartphone or RF device, the specific frequency bands, and the substrate material for the CMBPS.

In the embodiment of FIG. 3A, the conductive material preferably lies directly on the surface of the glass of a smartphone or the appropriate substrate surface of other RF devices when applied to such a device. In the case of a smartphone, the conductive (trace) layer is supported by a flexible non-conductive substrate that is placed on the screen of the device. The actual conductive layer can be more than one layer with various spacings between alternating layers of conductive and dielectric materials providing the potential for additional improvement in overall performance. Multiple conductive layers are possible. Multiple dielectric layers are also possible. The conductive layer does not need to be directly applied to the glass to be effective, but can be offset from the glass by another layer of dielectric material. It should also be noted that by changing the electrical characteristics of the aforesaid dielectric material, the CMBPS structure can be tuned to meet other radiation protection needs.

It should be noted that in a phone application, there may be a desire to preserve the light transmissivity of the incorporated display. As such, materials for the substrate and the traces may be selected based, at least in part, on their optical properties. For instance, a transparent substrate and transparent conductive coatings may be used in some embodiments. In other applications, other materials may be better suited.

In the embodiment of FIG. 3A, a hexagonal cell or element (e.g., element 303) is used as the base element because it is known to exhibit one of the widest bandwidths of elements in an FSS structure. Loop structures in general provide a wider band performance than other periodic structure elements. Elements of other shapes may be used in other embodiments.

A hexagonal element is also well suited for forming a compact structure. The hexagonal element specifically can be placed very close to the next hexagonal element, which provides a very wide band performance. Unlike a circular element structure that when placed close to its neighbors wastes lots of space between the arcs.

Protrusions (e.g., protrusion 305) on the hexagonal element are fractal structures. These protrusions make the current path longer around the circumference of each element. Since the current path is longer, the tuned frequency drops. Since the area used has not changed, and the frequency has dropped, a lower frequency tuned structure in the same space (more compact) is now achieved. Without the fractal growth inward (i.e., the protrusions), a larger area to achieve a resonant hexagonal structure would be required. Since the effectiveness of the overall structure requires many periods of elements, there are now additional smaller elements in the same overall area and thus a more effective structure.

Protrusion length is relevant since it is what helps to shrink each hexagonal element, which must occur to get as many repeats of the hexagonal element to increase the effectiveness of the device. The fractal growth inward of the hexagonal element increases the electrical length of each hexagonal element loop, which is proportional to wavelength, allowing lower frequencies to be addressed by this periodic structure.

Figure 4:
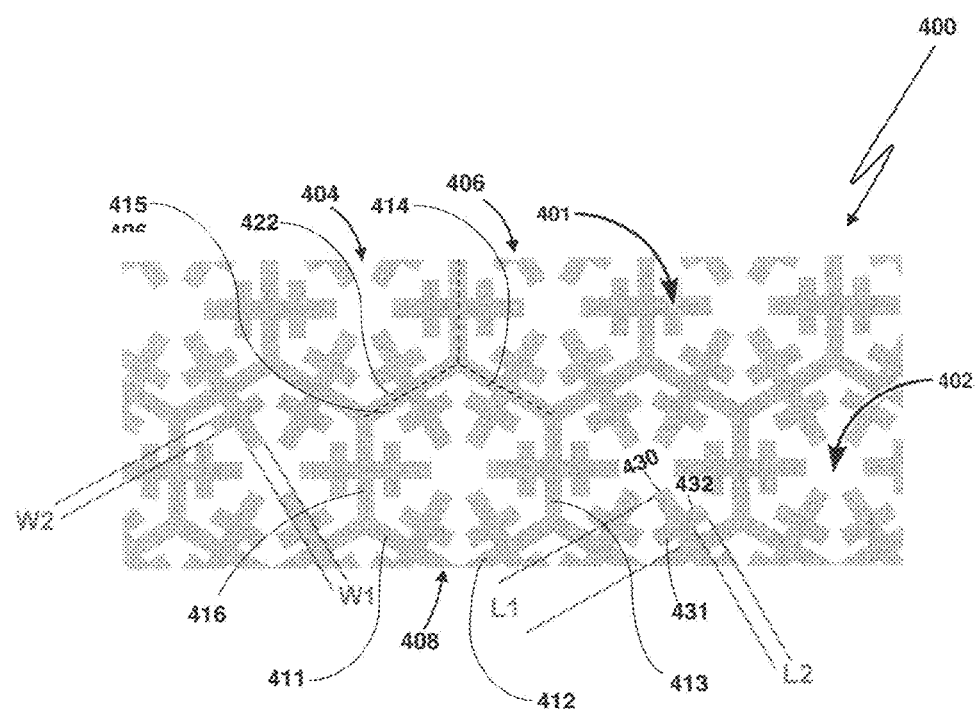
FIG. 4 is a schematic diagram showing detail of the embodiment of FIG. 3.

As shown in FIG. 4, another embodiment of a periodic structure assembly 400 is depicted (only a portion of which is shown) that incorporates conductive trace 401 and substrate 402. The conductive trace(s) define a plurality of electrically conductive elements (e.g., elements 404, 406, 408) that arranged in an array to form a periodic structure. Each of the conductive elements is formed by a set of interconnecting side walls. For instance, element 408 includes side walls 411, 412, 413, 414, 415 and 416. In this embodiment, adjacent elements are arranged so that gaps are not presented between adjacent elements. For example, a gap is not present between elements 404 and 408. In particular, each side wall (e.g., side wall 415) positioned adjacent to the side wall of another element (e.g., side wall 422) does not exhibit an intervening gap. Note that the demarcation between a set of adjacent side walls is represented by dashed lines in FIG. 4. In some embodiments (e.g., an embodiment that incorporates a continuous trace), adjacent periodic elements may be described as sharing an intervening side wall (i.e., side walls 415 and 422 may be formed as an integrated component).

In FIG. 4, a first order protrusion (e.g., protrusion 430) extends inwardly from each of the side walls. In this embodiment, each protrusion extends radially inwardly toward a center of its respective element. In addition to exhibiting a fractal dimension of the element, each protrusion incorporates a second order or sub-protrusion (e.g., sub-protrusion 431). In this embodiment, each protrusion includes an opposing pair of sub-protrusions (e.g., 431, 432) that extend perpendicularly from the protrusion. Notably, each sub-protrusion exhibits a fractal dimension of the respective protrusion.

In the embodiment of FIG. 4, the first order length growth of the periodic structure of this embodiment has L1 equal to 0.2699 mm, then L2 equal to 0.0905 mm. This is a proportion of 3 to 1 or a ⅓rd reduction from the order 1 fractal (L1) to the order 2 fractal (L2). Additionally, the first order width growth of the periodic structure has W1 equal to 0.0914 mm, then W2 equal to 0.0872 mm. This is a proportional reduction of 0.954 from the order 1 fractal (W1) to the order 2 fractal (W2). Since the proportions of the Length and Width are not the same, we refer to this as a Quasi-Fractal structure of the second order. The width factor is then modified to accommodate the widths of the original traces before the conductive fill is performed. The trace widths may be too large relative to the reduced geometry size after the second order reduction; therefore a more modest reduction may be required. Given the size/frequency relationship large enough to allow a true proportional fractal reduction, where all sizes have the same proportion reduced, could be performed achieving the similar results. It should be noted that other proportions may be used in other embodiments.

Neighboring elements create the filter effect of inductance and capacitance between and in the elements. In order to produce the high pass effect of the slot array technique used in the periodic structure, the space between elements is filled with conductive material (i.e., adjacent cells are contiguous—not spaced from each other as in FIG. 2). This achieves the loss response desired in the multiple bands. The key is that the conductive areas need to be highly conductive. The higher the dielectric constant (Dk) of the substrate, the smaller the elements in the periodic structure can be. If the conductive material is inserted between two dielectric layers, this should have an optimal effect due to the fact that it makes the effective dielectric constant surrounding the conductive material higher. The higher the effective dielectric constant surrounding the conductive material, the smaller the elements can be.

Figure 5A:
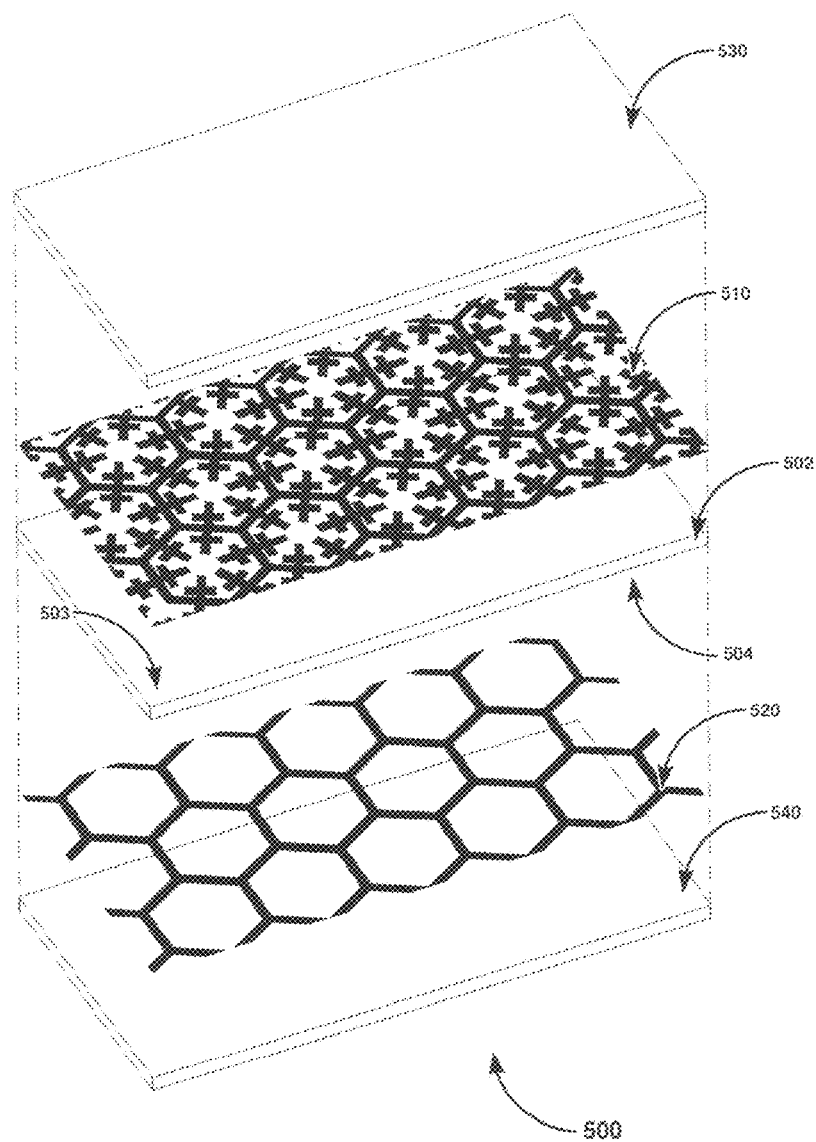
FIG. 5A is a schematic diagram of another embodiment of a multi-band periodic structure assembly.

Such an embodiment is depicted in FIG. 5A, in which a multi-layer configuration is depicted. As shown in FIG. 5A, periodic structure assembly 500 incorporates a dielectric layer 502 with a top 503 and a bottom 504. A frequency selective layer 510 is disposed on top 503 of dielectric layer 502. Frequency selective layer 510 includes a plurality of electrically conductive elements arranged as a periodic structure (it should be noted that the relative sizes of the elements may not be to scale and/or may not be depicted in an appropriate number or arrangement of elements as such are merely depicted for ease of description).

Figure 5B:
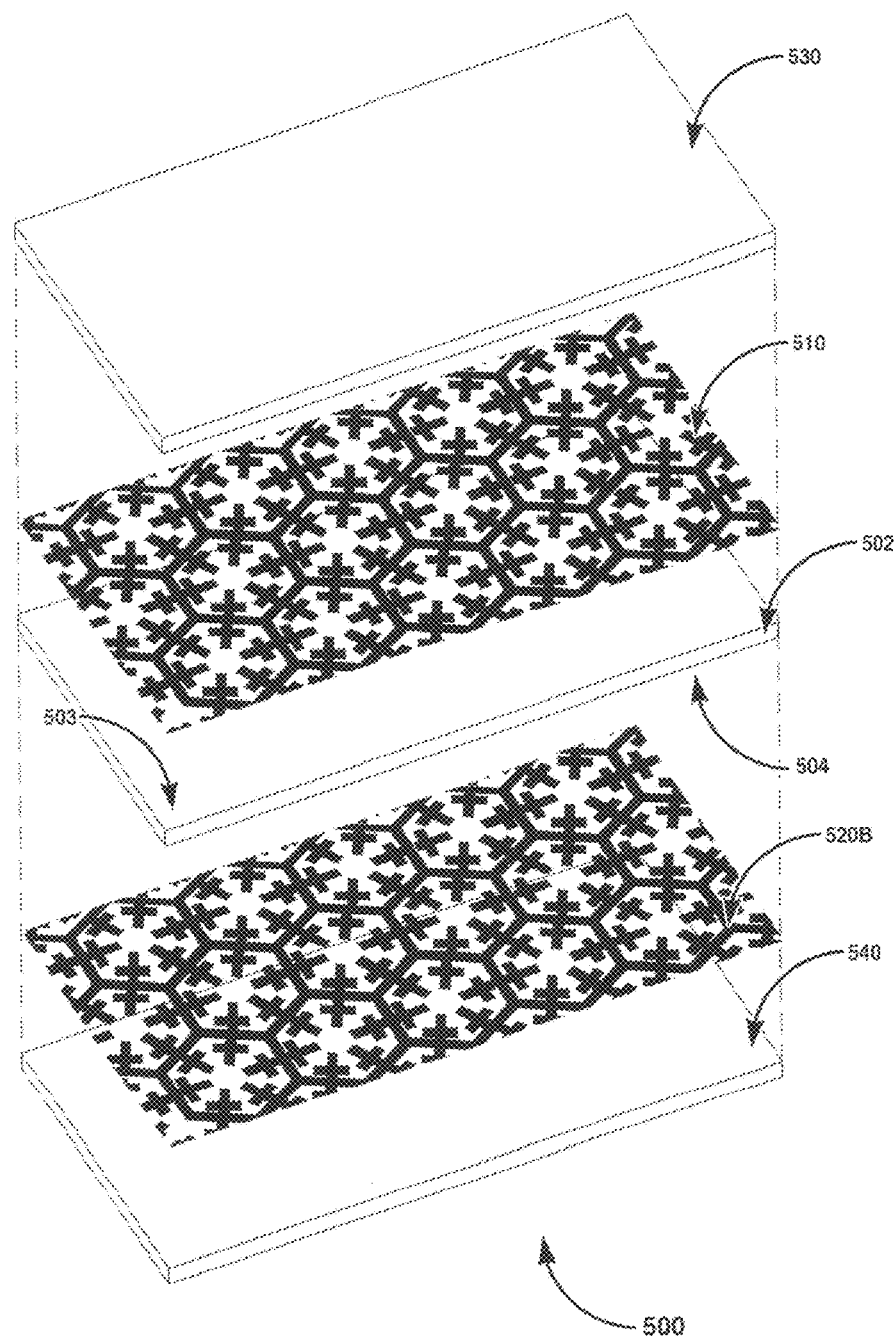
FIG. 5B is a schematic diagram of another embodiment of a multi-band periodic structure assembly.

Another frequency selective layer 520 is disposed on bottom 504 of dielectric layer 502. Frequency selective layer 520 also includes a plurality of electrically conductive elements arranged as a periodic structure. In some embodiments, the configuration of the periodic structure of frequency selective layer 510 (e.g., size, shape and/or number of elements, among others) is different from the configuration of the periodic structure of the frequency selective layer 520. By way of example, one or both of the periodic structures may exhibit a second order fractal geometry such as described before. In the embodiment of FIG. 5B, for instance, the frequency selective layer 520B incorporates a periodic structure of electrically conductive elements, with each being configured as a hexagon cell with hexagonal fractal geometry.

Other layers of the structure also may be provided in other embodiments, such as optional dielectric layers (e.g., dielectric layers 530, 540) and/or frequency selective layers (not shown).

An embodiment such as depicted in FIG. 3A was specifically targeted to the 698 to 960 MHz and 1710 to 2700 MHz cell phone bands for the purpose of reducing user exposure to unwanted radiation. Two metrics were used to evaluate the effectiveness of the CMBPS for this purpose.

Figure 6:
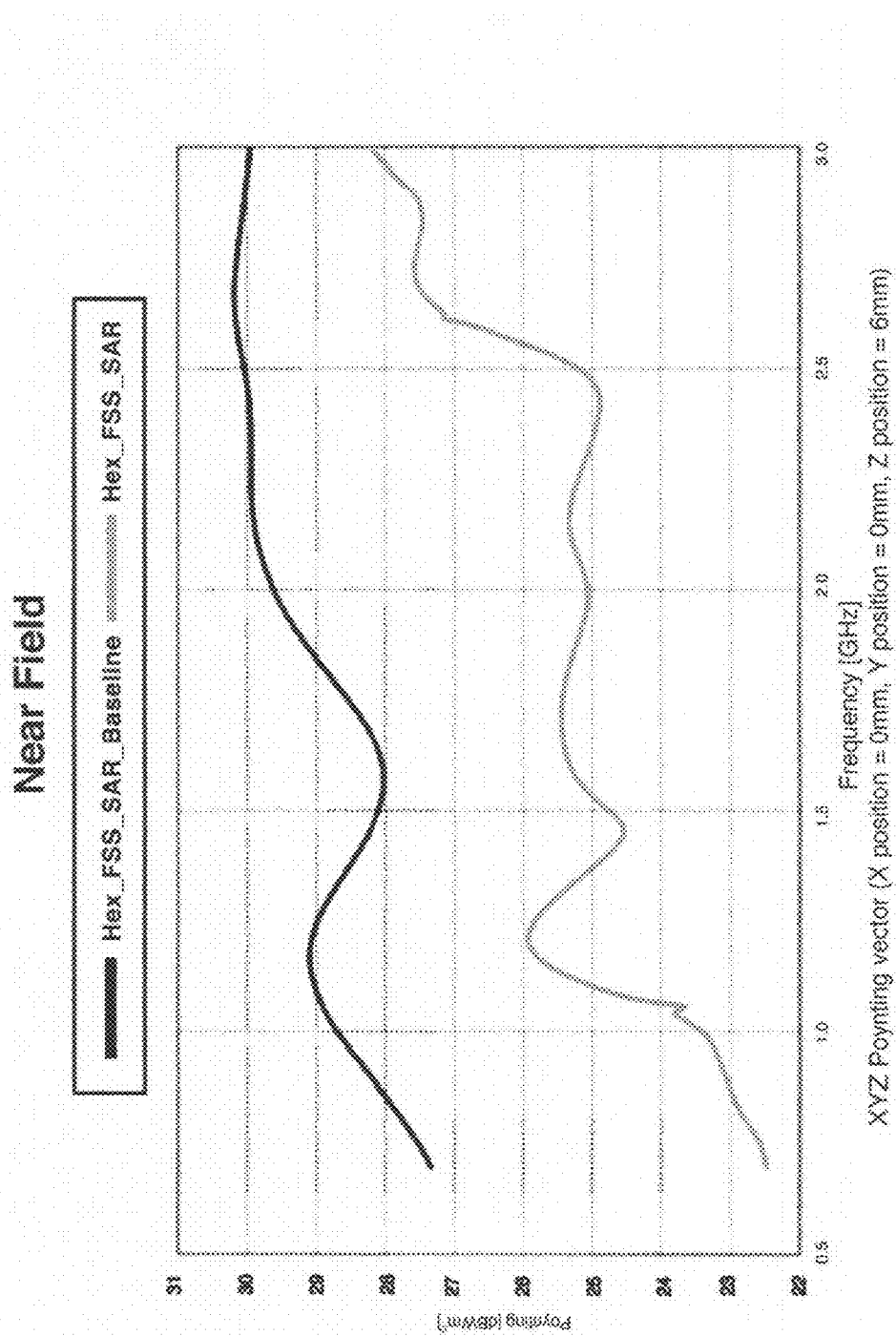
FIG. 6 is a graph depicting a comparison of frequency versus Poynting vector for a baseline FSS and an embodiment of a multi-band periodic structure.

The first metric used to evaluate the effective performance of the CMBPS for the stated purpose is the Poynting vector of the electromagnetic fields shown in FIG. 6 measured in decibel watts/meters squared (dBWm$^2$) at a depth of 6 millimeters (i.e. Near Field) in a simulated dielectric with the electrical properties of brain tissue. The plot (which depicts a baseline electrical field (Hex FSS SAR Baseline) where a CMBPS is not used in a solid black line, and an electrical field (Hex FSS SAR) where a CMBPS is used in a solid gray line) shows a minimum reduction of approximately 2.7 dB watts/meter squared over a frequency range of approximately 0.7 GHz to approximately 3.0 GHz, which is almost a 50% reduction in power in a given area at that level of penetration into the brain.

Figure 7:
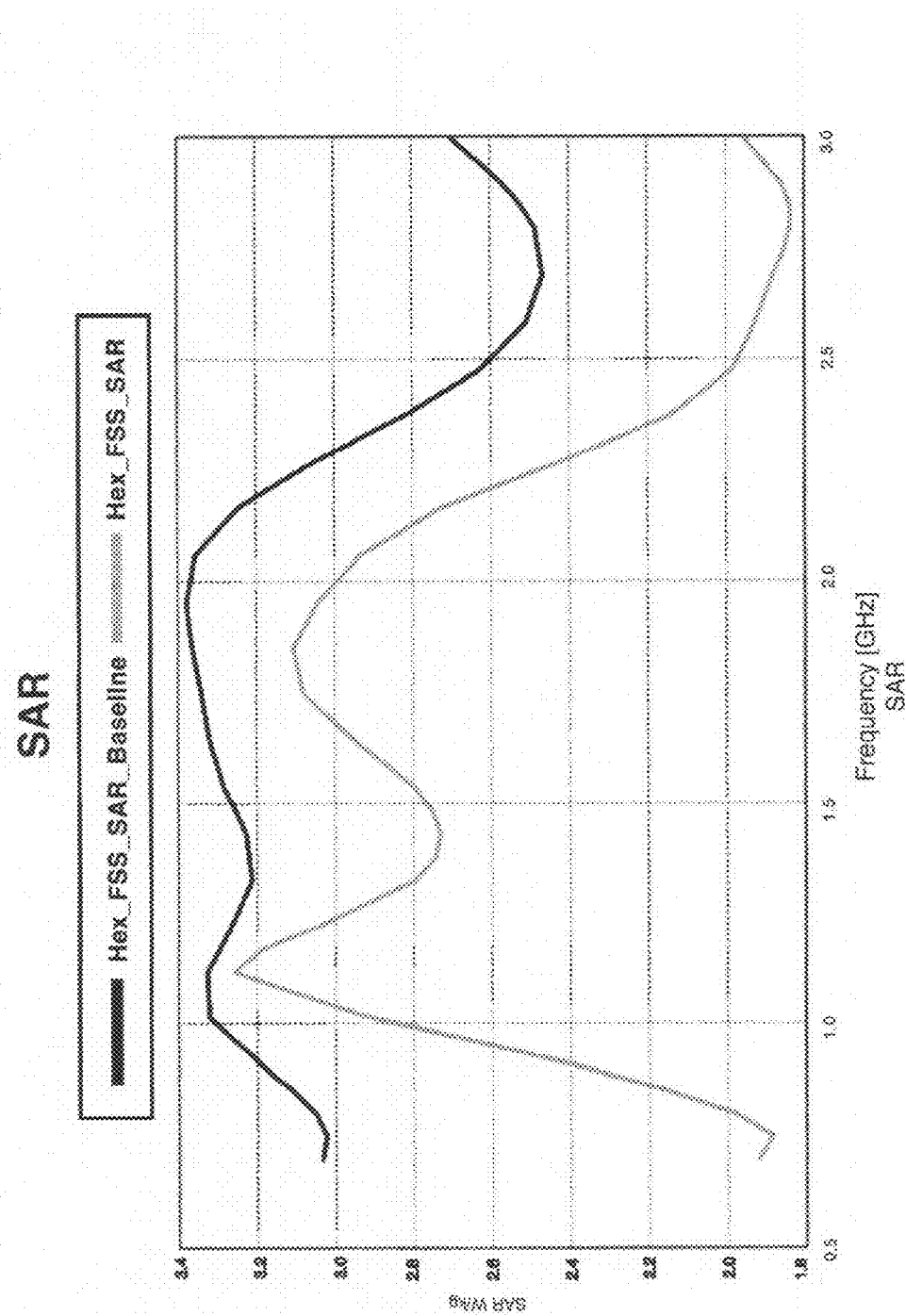
FIG. 7 is a graph depicting a comparison of frequency versus Specific Absorption Rate (SAR) for a baseline FSS and an embodiment of a multi-band periodic structure.

The second metric used to evaluate the effective performance of the CMBPS for the stated purpose is the Specific Absorption Rate (SAR), a measure of power absorption (watts) per unit mass (kg), as shown in FIG. 7. SAR has been found to be a reliable measure directly related to radiation hazards to humans and has significant use by regulatory agencies for that purpose.

In this analysis, the SAR was calculated over a volume of 121,000 cubic millimeters. In the plot, a solid black line depicts the baseline SAR (Hex FSS SAR Baseline) where a CMBPS is not used, and a solid gray line depicts the SAR (Hex FSS SAR) where a CMBPS is used, over a frequency range of approximately 0.7 GHz to approximately 3.0 GHz. In the lower 800-900 MHz cellular band, an approximately 25% reduction in SAR was achieved using a very compact MBPS. In the higher band, a 10% reduction or better in SAR was achieved over the entire band.

The reduction results assumed an analysis of the entire volume, including the edges of the volume that were equal in size to the periodic structure. This is significant because, as the fields concentrate and fringe around the device, the edges are exposed to higher levels of radiation. The results have not been skewed to apply to more favorable volume locations under consideration.

Figure 8:
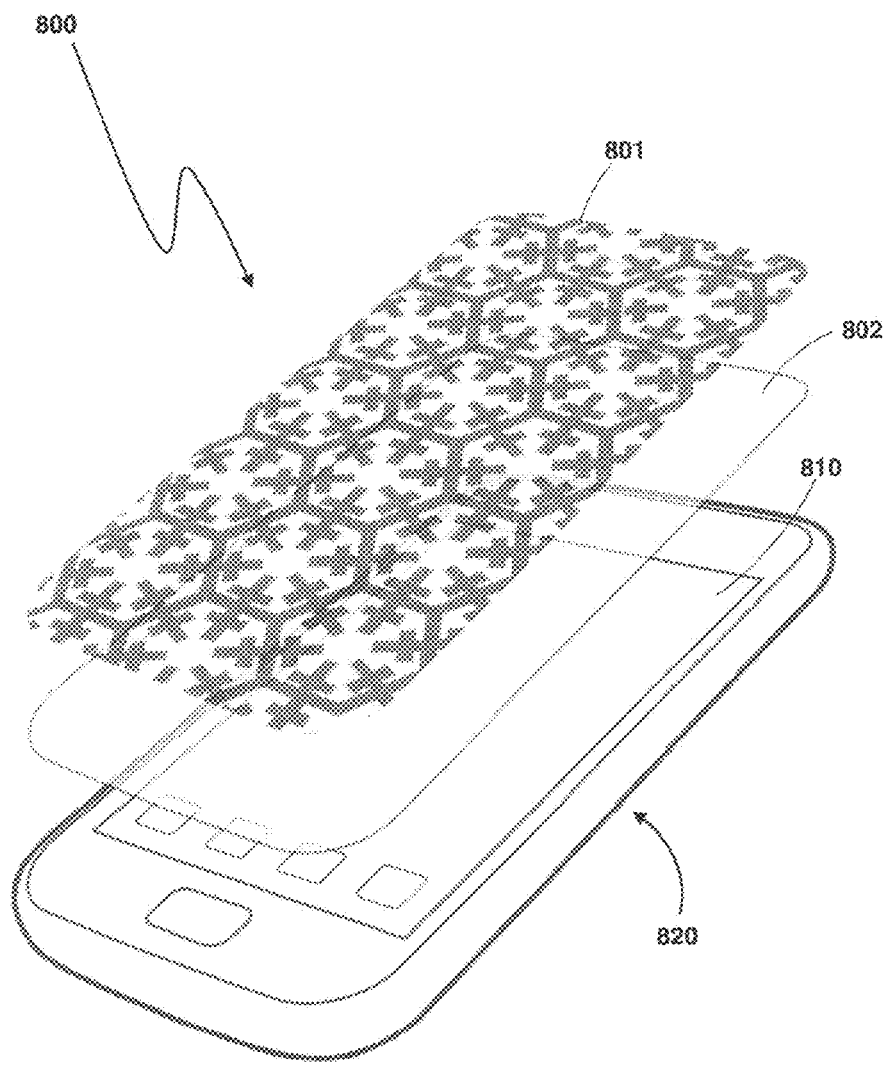
FIG. 8 is an embodiment of a periodic structure assembly that incorporates a flexible substrate applied to a representative RF device.

Another embodiment of a periodic structure assembly 800 is depicted in FIG. 8 that incorporates a flexible substrate applied to a representative RF device (e.g., a smartphone. As shown in FIG. 8, periodic structure assembly 800 includes a conductive trace 801 supported by substrate 802 of dielectric material (e.g., optically transparent dielectric material) that is placed on the screen 810 of the device 820.

Embodiments of an MBPS may exhibit one or more of the following:
(1) Reduce electromagnetic waves radiating over multiple commonly used radio frequency bands.
(2) Reduce the levels of exposure to users of small devices such as smartphones and other RF devices.
(3) Can fit into a smaller space than conventional periodic structures.
(4) Can be applied as a thin, flexible film, glass, or other suitable substrate.
(5) Can be applied to the screen of a smartphone or other RF device while still allowing the user to see the screen vividly.
(6) When used in other RF devices the reduction in electromagnetic radiation can be used to control RF in undesirable directions without degrading the RF signal in the intended field of use.

Embodiments of an MBPS may allow for specifically selected multi- or broadband frequency waves generated from small or compact communication devices to be redirected from specified paths. The novel design may protect the user from hazardous radiated fields by redirecting those fields away from the user, reducing electromagnetic waves radiating over multiple commonly used radio frequency (RF) bands. The RF energy redirected by the CMBPS is redistributed to other available paths, creating a stronger useable signal for the communication device. The novel design may allow it to be applied as a thin, flexible film substrate and can fit into a smaller space than conventional periodic structures. The novel design may allow it to be applied to the screen of the device and allows the user to see the screen vividly. The increased RF signal produced by the CMBPS may allow the device to consume less energy and provides a longer battery charge to battery-operated devices.

As described, a periodic structure assembly may be used to selectively reject or attenuate certain frequency ranges of electromagnetic waves from passing through a device while allowing others that lie outside of the desired frequency band. By way of example, a periodic structure assembly may be used to reduce electromagnetic fields emanating from smartphones and other portable and non-portable RF devices across multiple bands of operation in those devices.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure.

What is claimed is:

1. A periodic structure assembly, comprising:
    a dielectric layer having a top and a bottom;
    a first frequency selective layer disposed on the top of the dielectric layer, the first frequency selective layer having a plurality of electrically conductive elements arranged as a first periodic structure; and
    a second frequency selective layer disposed on the bottom of the dielectric layer, the second frequency selective layer having a plurality of electrically conductive elements arranged as a second periodic structure;
    wherein a first of the plurality of electrically conductive elements of the first periodic structure is configured as a hexagon cell with a hexagonal fractal geometry.

2. The periodic structure assembly of claim 1, wherein a configuration of the first periodic structure is different from a configuration of the second periodic structure.

3. The periodic structure assembly of claim 1, wherein the dielectric layer, the first frequency selective layer, and the second frequency selective layer are configured to apply to a display screen of a mobile phone.

4. The periodic structure assembly of claim 1, wherein a first of the plurality of electrically conductive elements of the second periodic structure is configured as a hexagon cell with hexagonal fractal geometry.

5. The periodic structure assembly of claim 1, wherein the plurality of electrically conductive elements of the first periodic structure are defined by conductive material forming a high pass structure.

6. The periodic structure assembly of claim 1, wherein:
    each of the plurality of electrically conductive elements of the first periodic structure has corresponding side walls; and
    the side walls of adjacent ones of the electrically conductive elements are shared between the adjacent ones of the electrically conductive elements.

7. A periodic structure assembly comprising:
    a substrate; and
    an array of periodic elements defined by a contiguous trace of conductive material supported by the substrate, each of the periodic elements exhibiting side walls, with each of the side walls having a respective inwardly extending protrusion.

8. The periodic structure assembly of claim 7, wherein each protrusion extends radially inwardly toward a center of a respective one of the periodic elements.

9. The periodic structure assembly of claim 8, wherein each protrusion exhibits a fractal dimension of the respective one of the periodic elements.

10. The periodic structure assembly of claim 8, wherein each periodic element is a hexagonal element.

11. The periodic structure assembly of claim 8, wherein each protrusion has a respective sub-protrusion extending perpendicularly therefrom.

12. The periodic structure assembly of claim 11, wherein each sub-protrusion exhibits a fractal dimension of the respective protrusion.

13. The periodic structure assembly of claim 7, wherein the substrate is formed of dielectric material.

14. The periodic structure assembly of claim 13, wherein the substrate is transparent.

15. The array of periodic structure assembly of claim 14, wherein the array of periodic elements are formed of a transparent trace coating.

16. The periodic structure assembly of claim 14, wherein the substrate is sized and shaped for applying to a display screen of a mobile device.

17. The periodic structure assembly of claim 16, wherein the mobile device is a mobile phone.

18. The array of periodic structure assembly of claim 7, wherein the side walls of adjacent ones of the array of periodic elements are shared between the adjacent ones of the periodic elements.

19. The periodic structure assembly of claim 7, wherein the substrate is a dielectric layer.

20. The periodic structure assembly of claim 19, wherein:
the periodic structure assembly further comprises a second dielectric layer; and
the array of periodic elements are disposed between the substrate and the second dielectric layer.

* * * * *